Nov. 9, 1954 M. CAMRAS 2,694,107

MAGNETIC RECORDER FOR USE WITH MOTION-PICTURE PROJECTORS

Filed Jan. 2, 1948 5 Sheets-Sheet 1

Inventor

Marvin Camras by The Firm of Charles W. Hills Attys.

Nov. 9, 1954 M. CAMRAS 2,694,107

MAGNETIC RECORDER FOR USE WITH MOTION-PICTURE PROJECTORS

Filed Jan. 2, 1948 5 Sheets-Sheet 2

Inventor
MARVIN CAMRAS by The Firm of Charles Hills Attys.

Nov. 9, 1954 M. CAMRAS 2,694,107

MAGNETIC RECORDER FOR USE WITH MOTION-PICTURE PROJECTORS

Filed Jan. 2, 1948 5 Sheets-Sheet 3

Inventor
MARVIN CAMRAS by The Firm of Charles H. Hill Attys.

MAGNETIC RECORDER FOR USE WITH MOTION-PICTURE PROJECTORS

Filed Jan. 2, 1948 5 Sheets-Sheet 4

Inventor
MARVIN CAMRAS by The Firm of Charles Hill Attys.

MAGNETIC RECORDER FOR USE WITH MOTION-PICTURE PROJECTORS

Filed Jan. 2, 1948

5 Sheets-Sheet 5

Inventor
MARVIN CAMRAS by The Firm of Charles W. Hills Attys.

United States Patent Office 2,694,107

Patented Nov. 9, 1954

2,694,107

MAGNETIC RECORDER FOR USE WITH MOTION-PICTURE PROJECTORS

Marvin Camras, Chicago, Ill., assignor to Armour Research Foundation of Illinois Institute of Technology, Chicago, Ill., a corporation of Illinois Application January 2, 1948, Serial No. 125

2 Claims. (Cl. 179—100.2)

My invention relates to an improved magnetic recording and reproducing mechanism particularly intended for use in conjunction with a motion picture projector.

In one type of sound motion pictures, the sound accompaniment of a visual program contained on a motion picture film is recorded along the length of a magnetizable track or channel running along one side of the motion picture film. Variations in the degree of magnetization are imparted along this track in accordance with the variations in the sound intensity. To reproduce this sound, together with the visual program, the film is run through a motion picture projector which projects the visual program on a viewing screen and through a magnetic reproducing device which is responsive to the variations in intensity of the magnetization of the record medium as it is drawn thereover.

During the projection of the visual program, it is necessary that each frame of the moving picture film remain in front of the lens system for the requisite or allotted time per frame, as, for example, 1/16 of a second. However, faithful reproduction of the sound accompaniment of the audible program from the magnetic track demands that the linear velocity of the medium across the recording mechanism be substantially constant inasmuch as variations in this velocity are reproduced as annoying frequency modulations commonly called "wow."

It is further necessary in magnetic recording equipment intended to record or reproduce the audible accompaniment to the visual program on a motion picture film to coordinate the motion of the film across the recording equipment with the speed of passage thereof through the motion picture projector to avoid entanglements or breakage of the film.

It is also highly desirable that the magnetic recorder portions of the complete sound motion picture projection mechanism shall constitute an entirely separate unit that may be marketed and sold as such independently of the motion picture projector. Moreover, the unit should be capable of operation with standard motion picture projectors regardless of manufacture and requires no changes in the projector to permit operation as a unit in conjunction therewith, and that the sound accompaniment of the visual program be inherently synchronized therewith without requiring complicated interconnecting equipment between the magnetic recorder unit and the motion picture projector. It is further necessary to an effective unit for this purpose that the structure of the unit be such that the film may be threaded through the magnetic recorder mechanism without interfering with the optical portions of the projector without requiring that the film be removed therefrom and in a manner similar to the manner in which the film is inserted in the optical portions of the projector.

In the interest of brevity I have used the term "magnetic recorder" herein to designate equipment operable either to record on a magnetizable record medium or to reproduce the intelligence previously recorded thereon or selectively operable to accomplish either result inasmuch as the structures described and claimed here are equally effective in connection with the reproducing and the recording of intelligence on a lengthy medium having a magnetic track.

It is therefore a general object of the present invention to provide an improved magnetic recording mechanism for use in conjunction with a motion picture projector.

Another object of the present invention is to provide an improved magnetic recording mechanism for use with a motion picture projector and which may be operatively associated therewith without alterations thereof.

Further, it is an object of the present invention to provide an improved magnetic recording mechanism for use in connection with a motion picture projector and which inherently operates in accord with the movements of the film through the projector.

Yet another object of the present invention is to provide an improved magnetic recording mechanism for use in connection with a motion picture projector and which is constructed to permit simple threading of the film through the recording mechanism.

Another object of the present invention is to provide an improved assembly for use in a magnetic recorder of the type intended for use with mechanism wherein intermittent motions are imparted to a lengthy magnetizable medium.

It is a further object of the present invention to provide an improved guide assembly for use in magnetic recorders of the type wherein the intelligence is contained on a magnetizable track extending along a motion picture film.

It is yet another object of the present invention to provide an improved mechanism for frictionally engaging a motion picture film having a magnetizable sound track as it passes over a capstan.

Still another object of the present invention is to provide an improved lengthy magnetizable record medium.

Still another object of the present invention is to provide an improved magnetic recording and reproducing mechanism suitable for use in connection with a motion picture projector and which includes features of construction, combination and arrangement whereby the mechanism is inexpensive in construction and reliable in operation and conveniently associated for cooperative action with the motion picture projector and has readily accessible operating elements.

The novel features which I believe to be characteristic of my invention are set forth with particularity in the appended claims. My invention, itself, however, both as to its organization and method of operation, may best be understood by reference to the following description taken in connection with the accompanying drawings in which:

Figure 15:
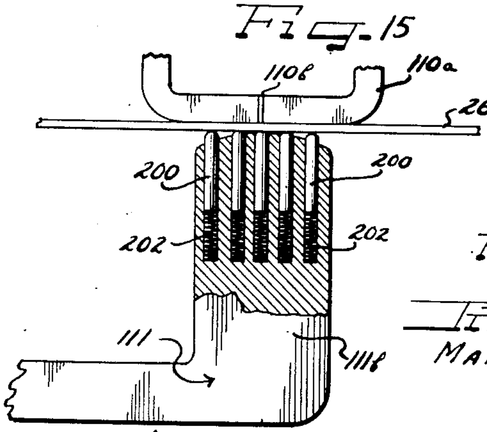
Figure 16:
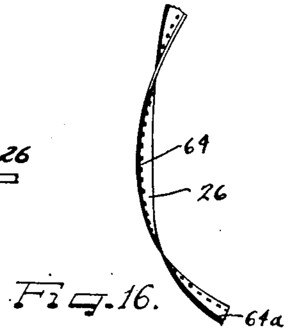

Figure 15 is a greatly enlarged side elevational view of a modified embodiment of the shoe mechanism to urge the film against the pole pieces of the electromagnetic transducer head, with parts broken away to show the operation thereof; and Figure 16 is a view of a portion of a motion picture film bearing modified magnetizable sound tracks, the portion shown being a portion between the gate mechanism of the projector and the head assembly.

As shown on the drawings:

The assembly shown in Figures 1, 2, 3 and 4 comprises a motion picture projector, generally indicated at P, mounted upon a magnetic recorder housing indicated generally at H. The projector P constitutes the mechanism by which a visual program contained on the motion picture film is projected on a suitable viewing screen whereas the housing H contains the elements of a magnetic recording and reproducing mechanism.

Figures 1, 2, 8:
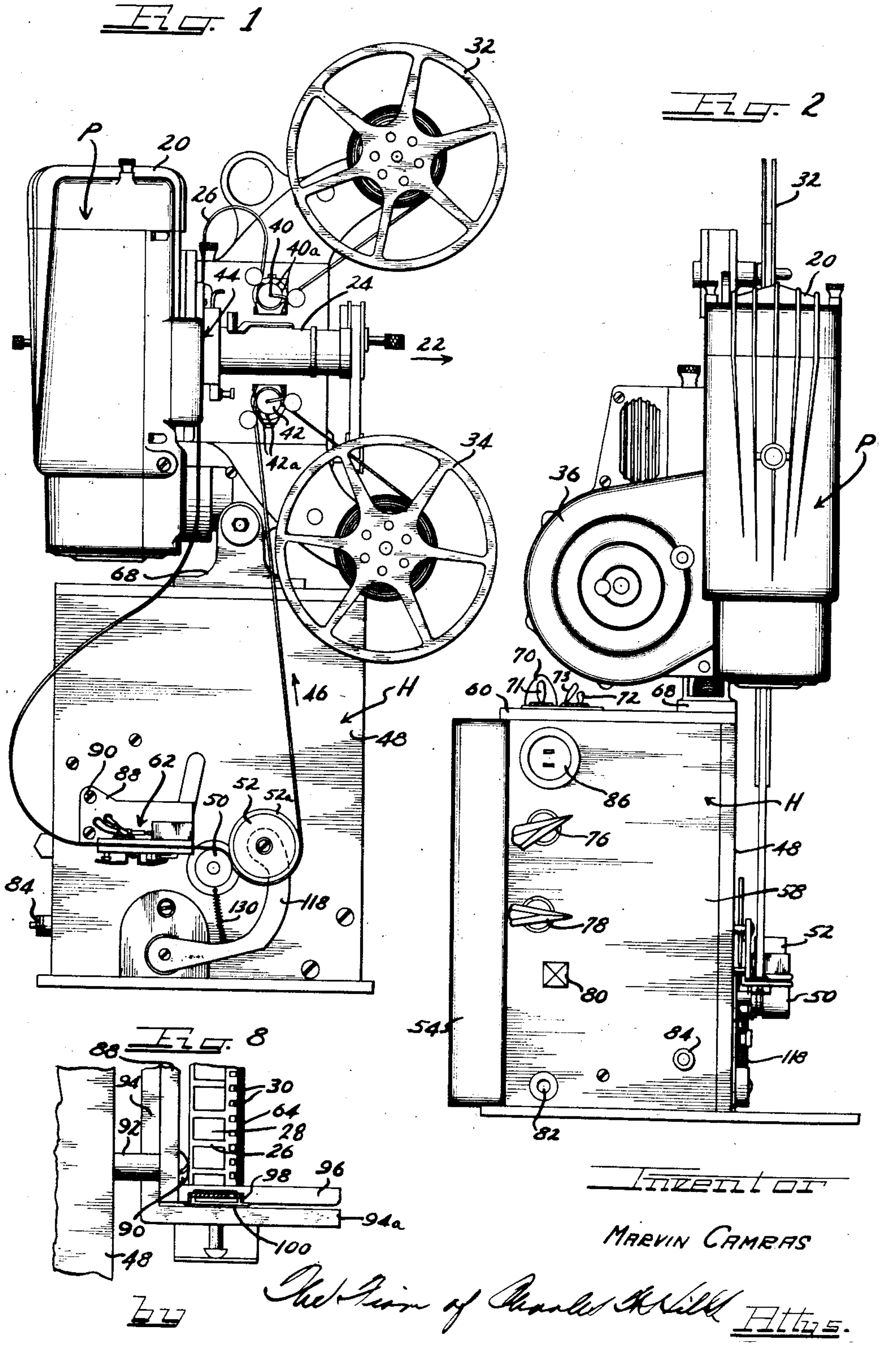
Figure 1 is a side elevational view showing a mechanism constructed in accordance with the principles of the present invention, together with a motion picture projector mounted thereon.
Figure 2 is a rear elevational view of the mechanism shown in Figure 1.
Figure 8 is an enlarged fragmentary view of a portion of the mechanism as shown in Figure 2.

The projector P, for example, includes a housing 20 in which is disposed a lamp, together with reflectors and lenses as necessary, to produce a light beam extending in the direction of arrow 22, Figure 1. This beam is passed through the lens system 24 which focuses the light rays impinging on the moving picture film 26, this focusing being made on a suitable viewing screen (not shown). In this process, the film passes through gate mechanism 44 which imparts intermittent motion thereto. A shutter (not shown) is interconnected with the gate mechanism to interrupt the light beam while the film is in motion.

Figures 3, 4:
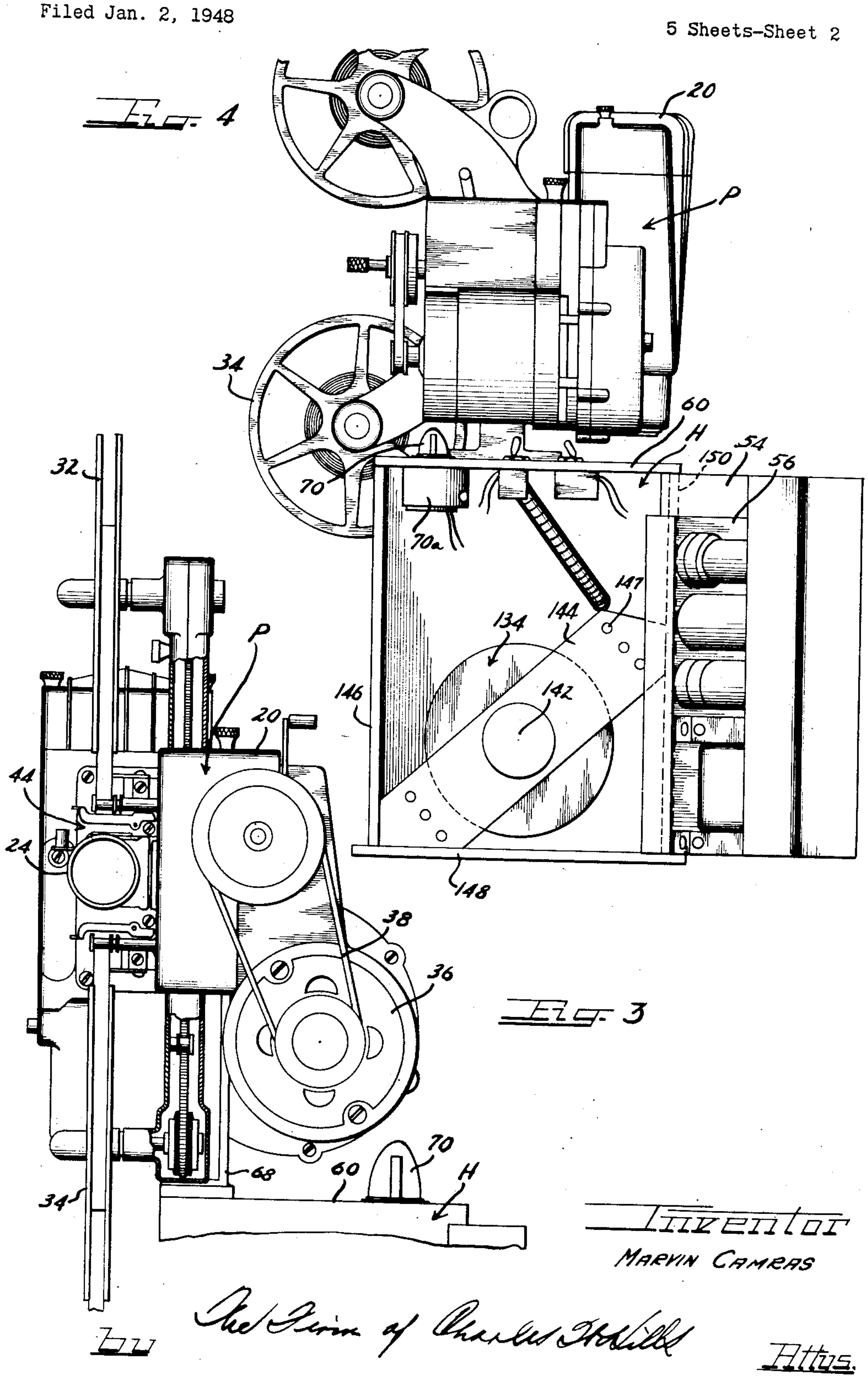
Figure 3 is a front elevational view of the motion picture projector portion of the mechanism shown in Figure 1 and showing fragmentary portions of the magnetic sound recording mechanism.
Figure 4 is an elevational view from the side opposite the side of Figure 2 and of the mechanism of Figure 2 with the door open to expose the interior elements of the mechanism to view.

The film 26 consists of a lengthy strip of Celluloid or similar transparent material divided into a succession of picture frames 28, Figure 8, and having along one side thereof a plurality of indexing openings 30. When the projector is operating, the film unwinds from release reel 32, Figure 1, travels through gate mechanism 44, and winds on the take-up reel 34. The motion picture projector P includes a motor 36 which is best seen in the views of Figures 2 and 3 and which is coupled by the belt 38, Figure 3, to suitable gears and other driving elements which impart yielding take-up rotation to the reel 34. Moreover, the motor 36 is connected to the drive wheels 40 and 42, Figure 1, to impart film driving rotations thereto. Drive wheel 40 has a plurality of projections or points **40*a* which ride in the indexing openings 30 of the film 26. Drive wheel 42 has similar projections 42*a***.

The motion picture projector P includes a gate mechanism shown generally at 44 to impart intermittent motion to the film 26 as it passes between the housing 20 and the lens 24. This mechanism may, for example, include a Geneva gear driven from the motor 36 and operable at successive instants of time to shift the film 26 at a distance equal to the length of one of the frames 28, Figure 9. Preferably this mechanism further includes centering elements which seat on the indexing openings 30 to index the position of the successive frames relative to the lens 24 and the housing 20 to center the successive images on the viewing screen. This gate mechanism is conventional in motion picture projectors and constitutes no portion of the present invention.

The film 26 is threaded into the gate mechanism 44 from the same side as it is threaded over the wheels 40 and 42. This is the right-hand side of the mechanism as seen in Figure 2.

During normal operation of the projector P, the wheel 40 rotates to draw the film 30 from the reel 32. Friction braking elements are interconnected with this reel to maintain the film 26 taut between the wheel 40 and the reel 32. Upon leaving the wheel 40, the film 26 passes between the housing 20 and the lens 24, intermittent motion being imparted to the film in this region by the gate mechanism indicated generally at 44. As each successive frame of the film is displayed on the viewing screen, the picture contained in that frame is viewed, and since the frame repeats at a rate greater than the rate corresponding to persistence of vision, the picture appears to move. Upon leaving the gate mechanism 44, the film 26 passes downwardly to the magnetic recording mechanism mounted in the housing H, and upwardly therefrom in the direction of the arrow 46 to the drive wheel 42. This drive wheel rotates in synchronism with the operation of the gate mechanism 44 and the drive wheel **40*a* to take up the film 26 at the rate corresponding to its rate of passage through the gate 44. Finally, the film is wound on reel 34, being held taut between that reel and the wheel 42** by clutch driving elements which slip to maintain this taut condition.

The housing H supports the capstan 50 and the pinch wheel 52, Figure 1, which extend outwardly of the side 48 of the housing H to vertical alignment with the gate mechanism 44 to receive the film 26, as is best seen in Figure 3. The housing H includes a door 54 extending across the side 48 and the front portion thereof and upon which is mounted a chassis 56 containing the electronic and other electrical circuit portions of the magnetic recording and reproducing mechanism itself. This door is swung to the open position in Figure 4 to show the arrangement of the chassis. Suitable control dials for the magnetic recording and reproducing mechanism are mounted on the rear panel 58 of the housing H, and switch controls are mounted on the top panel 60 as indicated in the figures.

In addition to the capstan 50 and the pinch wheel 52, the electromagnetic transducer head assembly, indicated generally at 62, is supported from the side panel 48 of the housing H. This assembly is described in further detail hereafter.

The magnetic recording and reproducing mechanism includes elements operable to produce a magnetic field in the assembly 62 and directed longitudinally of the magnetic track or channel 64 of the film 26. These elements are aligned with the magnetic sound track 64 of the film 26, which track may be seen in the view of Figure 8 and may, for example, be located outwardly of the indexing notches 30 cut in the film as shown in that view.

During the recording operation, voice or other audible program material is converted by a microphone or similar device to an electromotive force varying in accord with the intensity of the sound waves which is then applied to the electromagnetic transducer head assembly 62 to cause time variations in the intensity of the magnetic field produced thereby. Variations in the degree of magnetization are thereby imparted along the magnetizable track 64 in accord with the time variations of the intelligence.

During the reproduction, the film 26 is drawn across the head assembly 62 in the same manner as during recording, thereby inducing a time varying electromotive force therein in accord with the time variations of the intelligence. This electromotive force is amplified and applied to a loud speaker or similar device to reproduce the original intelligence.

The structure of the magnetic transducing heads by which the foregoing operation is achieved is described in further detail hereafter.

The projector P is supported upon the upper panel 60 of the housing H by the adjustable support 68 which rests thereon and may, if desired, be attached thereto.

The various operating elements for the magnetic recording portion of the subject invention are mounted on the top panel 60 of the housing H and the side panel 58 thereof. The elements mounted on the top panel include the speed control knob 70 which is connected to rheostat **70*a* to control the speed of motor 36 and the rate of reproduction of the visual and audible program. In addition, the switches 71, 72 and 73 control the energization of the motor 36, the lamp of projector P, and the rewind mechanism of projector P, respectively. The control knob 76 of panel 58 controls the volume of the sound reproduced during reproducing of the audible program whereas the knob 78 is selectively operable to shift the recording and reproducing mechanism to record or reproduce conditions as are desired. The transparent cap 80 covers a neon bulb which flashes when the volume of the signals being recorded exceeds a predetermined level. The knob 76 may be controlled to adjust this flashing and thereby fix the level of the recorded signals at the most effective value. The jack 82 in the panel 58 is provided for connection to a speaker, and the jack 84** is provided for connection to a microphone. A socket 86 is provided in the upper portion of the panel 58 of the housing H to receive a bayonet plug connected to a source of energizing power.

Figure 5:
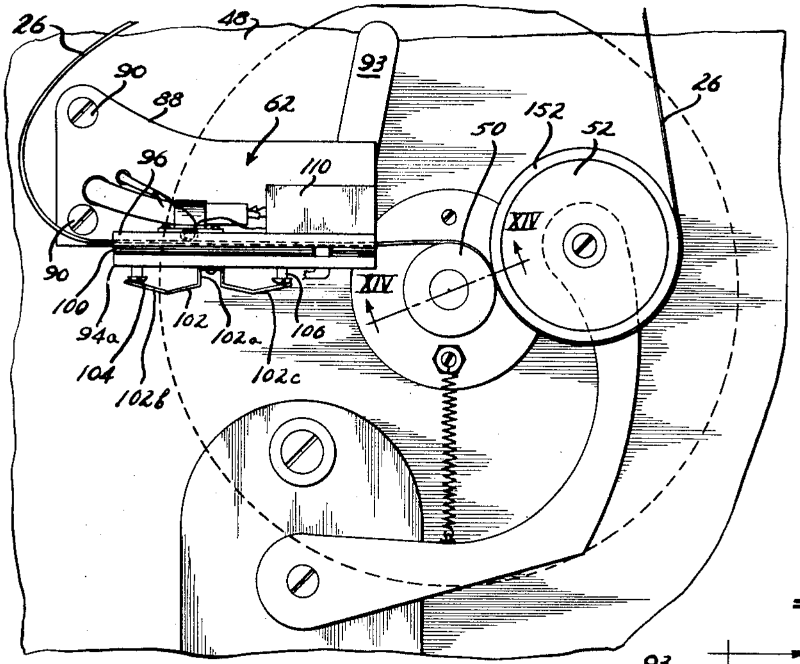
Figures 5 and 6 are enlarged side elevational views showing the mechanical drive portions of the magnetic recording mechanism of the present invention.
Figures 6, 7:
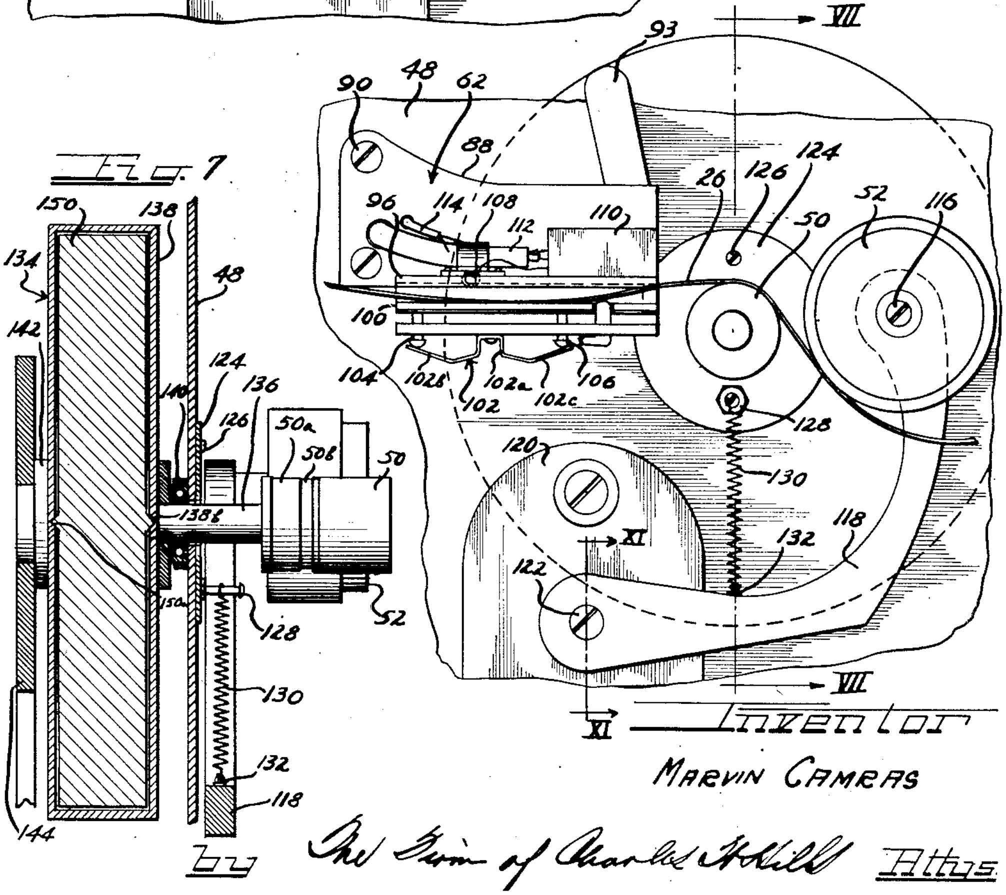
Figure 7 is a cross-sectional view through the axis VII—VII of Figure 6.
Figure 9:
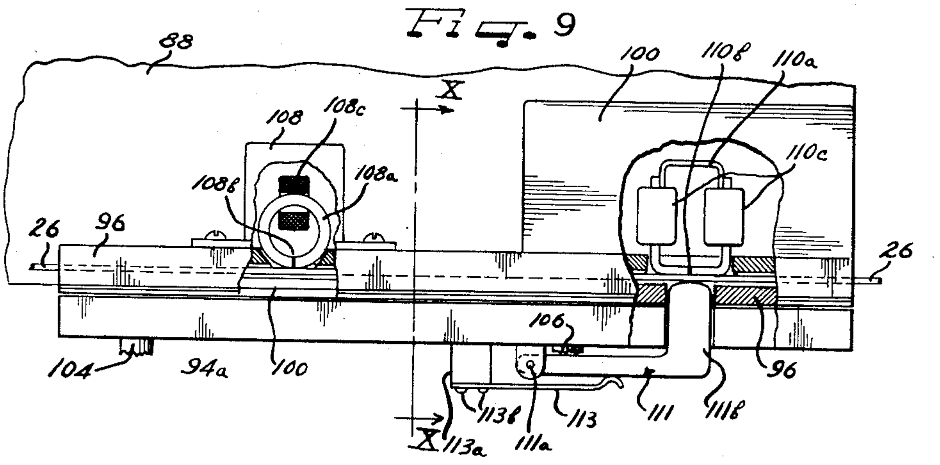
Figure 9 is an enlarged side elevational view of the guideway and head assembly of the mechanism of Figure 1 with portions broken away to show in further detail the construction thereof.
Figure 10:
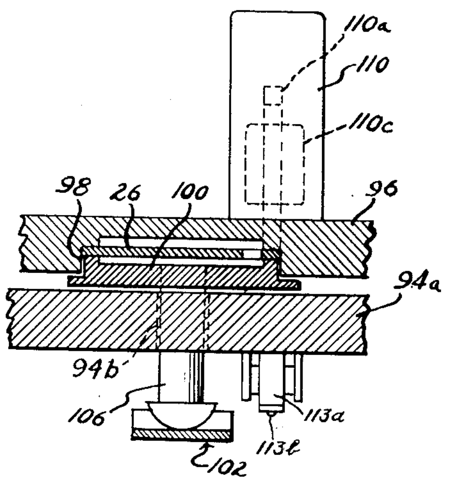
Figure 10 is a cross-sectional view through the axis X—X, Figure 9, showing the elements operable to urge the film against the track through which it rides.

The construction of the head assembly 62 may best be understood by reference to the enlarged side views of Figures 5 and 6, together with a view of Figure 8 which shows this portion of the mechanism in elevation. Enlarged views of this assembly are shown in Figures 9 and 10. As shown by these views, the assembly 62 is mounted on a bracket plate 88 which is supported from the panel 48 by a plurality of screws 90 which hold this plate in spaced position relative to the panel 48 by reason of the sleeves 92 which are best seen in the view of Figure 8. The angle bar 94 is attached to the plate 88 for vertical shifting movements and extends outwardly thereof to form a horizontally disposed member 94*a*. A lengthy member 96 is also supported in a horizontal position from the bracket 88 and is provided with a groove to define the longitudinally extending track 98 to receive the film 26. This groove is best seen in the view of Figure 10. The film 26 is urged against the upper portion of this track by the shoe 100 which may be seen in end view in Figure 10 and in side elevation in Figures 5 and 6 and which is yieldably mounted upon member 94*a*.

The shoe 100 is urged upwardly to bias the film 26 against the upper portion of the track 98 of the member 96 by the spring 102. This spring is fixedly attached at its center portion 102*a* to the member 94*a*. Moreover, this spring extends in each direction longitudinally of the member 94*a* in a bent shape to form the two leaf portions 102*b* and 102*c* which bear against the heads of the screws 104 and 106 respectively. As is best seen in the cross-sectional view of Figure 10, these screws pass through suitable openings 94*b* in the member 94*a* and are threadedly inserted in the lengthy shoe 100. Thus, as the spring 102 biases the screws 104 and 106 in an upward direction, it urges the shoe 100 against the film 26 to seat that film in the track provided in the lengthy member 96. Accordingly, the film 26 rides in this track as it traverses the mechanism 62.

In addition to holding the film 26 in the track defined by member 96, the shoe 100 frictionally opposes movements of that film, thereby tensioning the film in the region between sprocket 42 and the head assembly 62. This tension urges the pinch wheel 52 against the capstan 50 to achieve a good frictional engagement therebetween, thereby causing the film 26 to travel through member 96 at a uniform velocity determined by rotations of capstan 50 and ironing out the flutter associated with operation of gate mechanism 44.

It will be evident from Figure 10 that the shoe 100 engages the film 26 along the edge portions thereof. This avoids any tendency to scratch the film or to impart intermittent motions thereto by reason of the openings 30 catching on the shoe or member 96.

Figure 12:
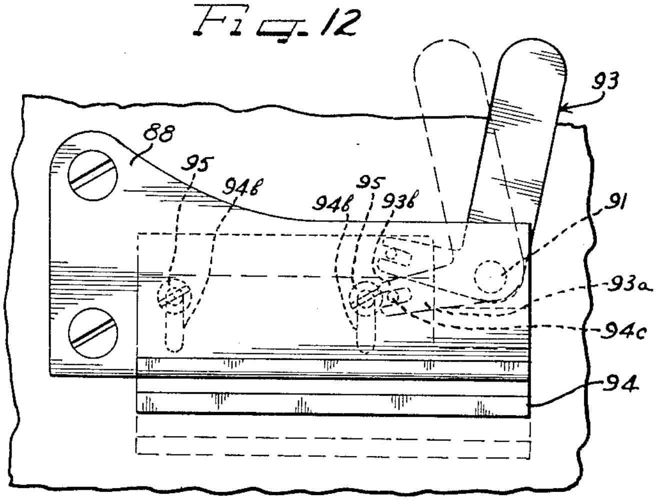
Figure 12 is an enlarged fragmentary side view showing the support mechanism for the shiftable guide member and having parts removed to show clearly the operation thereof.
Figure 13:
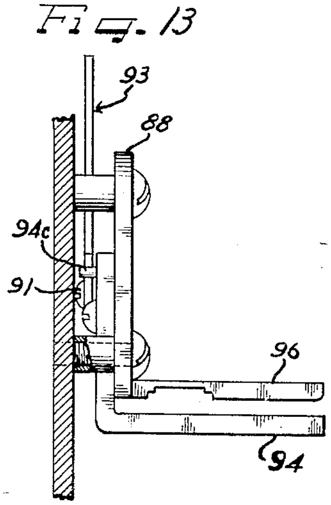
Figure 13 is an end view like Figure 12, showing the support mechanism for the shiftable guide member.

The member 94*a* is retractably supported from the plate 88 for up-and-down movements relative thereto by the mechanism shown in the enlarged fragmentary broken-away views of Figures 12 and 13. As indicated in Figure 12, a pair of vertically elongated slots 94*b* are formed in the vertical portion of the angle plate 94 and receive the screws 95 which are attached to the plate 88. A horizontally disposed pin 94*c* is mounted in plate 94 at its upper portion.

The up-and-down movements of the member 94 are controlled by the crank 93 which has a horizontally extending arm 93*a* with a bifurcated end portion 93*b* to receive the pin 94*c*. The crank 93 is pivotally supported from the plate 88 by the pin 91. When the crank 93 is in the position of Figure 5 where it is tilted to the right, the member 94*a* is in an engaged position and biases the shoe 100 against the film 26 as shown in Figures 5 and 8. When the crank 93 is tilted to the left as in Figure 6, the member 94*a* is retracted and releases the film 26 as indicated in Figure 6.

The assembly 62 includes a pair of magnetic transducer heads 108 and 110. These are mounted on the member 96 for cooperative engagement with the film 26 as it rides in the track 98. This construction of the heads 108 and 110 is shown in the enlarged fragmentary view of Figure 9 which is broken away about these heads to show them more clearly. As will be evident from this view, the head 108 which acts as an erase head includes a circular magnetic core 108*a* having an air gap 108*b* disposed immediately above the film 26. Moreover, a coil 108*c* is wound around the core 108*a* to carry the current flow necessary to produce a magnetic field across the gap 108*b*. As is well understood by those skilled in the art, current flow in the coil 108*c* produces a magnetic field across the air gap 108*b* which fringes in the region of this gap to follow the relatively high permeability path formed by the magnetic track 64, Figure 8, of the film 26 which rides against this air gap. By causing unidirectional or high frequency current flow through the coil 108*c*, the medium 26 may be prepared for recording a signal by imposing a constant bias magnetization or by the high frequency demagnetization as desired. A portion of the core 108*a* extends into the track 98 to engage the film 26 as it travels therein. The film is biased against this core by the shoe 100.

The head 110 which acts as a recording and reproducing head is constructed in a manner similar to the erase head 108. For example, as indicated in Figure 9, this head may comprise a rectangular core 110*a* having an air gap 110*b* disposed to bear against the film 26. A coil 110*c* is wound about the core 110*a* to link magnetic flux therein. During recording, the coil 110*c* is connected to a source of electromotive force varying in accordance with the desired audible program, thus causing the flux in the core 110*a* to vary in accord with this program. The magnetic field across the air gap 110*b* accordingly varies and imparts magnetization to the track 64 of the film 26 in accord with the program. During reproduction, the passage of the film 26 across the air gap 110*b* varies the flux of the core 110*a* and produces a voltage in the coil 110c which may be amplified and applied to a sound reproducing device.

The medium 26 is held against the core 110*c* of the head 110 by the spring biased arm 111. This arm is pivotally supported from the member 94*a* by the pin 111*a* and is provided with an upwardly extending shoe portion 111*b*. The arm 111 is urged in the counterclockwise direction by the spring 113 which is supported from the member 94*a* by the spacer 113*a* and the screws 113*b*, the latter being in threaded engagement with member 94*a*.

The magnetic transducer heads 110 and 108 are connected to the magnetic recording and reproducing mechanism contained in the housing H by the conductors 112 and 114 respectively, Figure 6.

Figure 11:
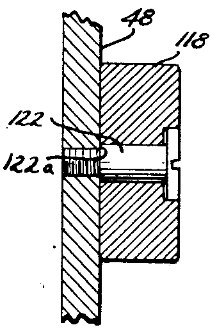
Figure 11 is a cross-sectional view through the axis XI—XI, Figure 6.

It is the purpose of the capstan 50 and the pinch wheel 52, Figure 6, to impart predetermined linear velocity to the film 26 as it passes thereover, thus imparting a predetermined linear velocity to the film as it is passed through the head assembly 62. To this end, the pinch wheel 52 is mounted upon pivot 116 which is in turn supported on the bent arm 118 which is pivotally supported from the bracket 120 by the screw 122. As is shown in Figure 11, the arm 118 is supported by the screw 122 which is in threaded engagement with panel 48 and has a shoulder 122*a* which engages the face of panel 48 to hold the screw 122 in place without tightly engaging the arm 118.

The capstan 50 is supported from the side panel 48 by the plate 124 which is attached thereto by the screws 126 and 128. As seen in Figures 6 and 7, the latter screw extends outwardly from the surface of the plate 124 to form a pin to receive the hooked-over end portion of the springs 130 which is hooked to an eyelet 132 attached to the arm 118. This spring acts to overcome the weight of arm 118 to reduce the tension on medium 26 required to urge pinch wheel 52 against the surface of the capstan 50. This action is described in further detail hereafter.

It is the purpose of the flywheel assembly 134, Figure 7, to stabilize the rotation of the capstan 50 and thus to impart constant linear velocity to the film 26 as it passes thereover. To this end, the capstan 50 is mounted on a shaft 136 which supports the outer cylindrical housing 138 of the flywheel assembly 134. The shaft 136 is itself sustained in position by the bearings 140 and 142 which ride in openings formed in the side panel 48 and the support bracket 144 respectively. As will be evident from the view of Figure 4, the support bracket 144 is held relative to the front panel 146 of the housing H by screws 147.

The housing 138 of the flywheel assembly 134 contains a massive rotor 150 which is pivotally supported for rotation relative to the center of shaft 136 by the pins 150*a* and 150*b* which ride in suitable recesses 138*a* and 138*b* in the housing 138. A viscous damping fluid such as oil is contained within the housing 138 to cause the massive rotor 150 to partake of the rotations of the housing 138.

The flywheel assembly 134 acts as a mechanical filter to sustain the rotations of the shaft 136 at a constant angular velocity despite variations in the torque applied thereto. As the shaft 136 is first rotated, the housing 138 likewise rotates, and the massive weight 150 is accelerated by the viscous friction between the housing and the flywheel due to the presence of the oil damping fluid. When the flywheel is rotating at full speed, the massive weight 150 rotates at substantially the same angular velocity as does the housing 138. However, any torque applied to the shaft 136 tending to cause acceleration or deceleration thereof is resisted by the viscous friction between the housing 138 and the rotor 150, and the actual change in velocity imparted to the shaft 136 is reduced to a small value.

The capstan 50 is provided with a circumferential groove or slot 50*a* to receive the film 26, together with an additional slot 50*b* to receive the portion of the film bearing the indexing openings 30. This additional slot avoids variations in the linear velocity of the film 26 caused by the presence of these openings.

Figure 14:
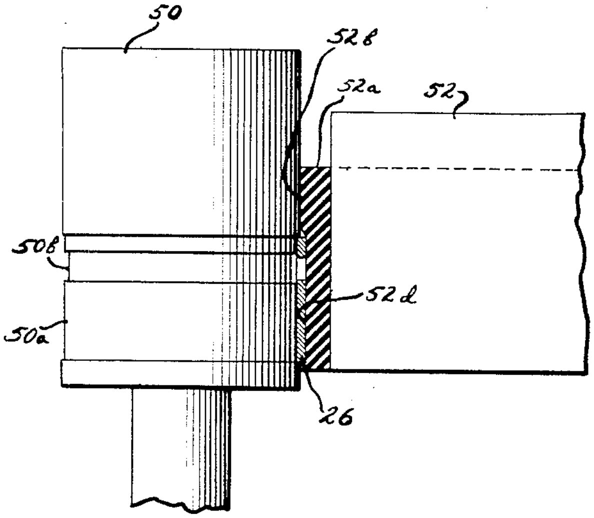
Figure 14 is a cross-sectional view through the axis XIV—XIV, Figure 1, with parts in elevation, and showing how the motion picture film is pinched between the capstan and pinch pulley.

The engagement between the capstan 50 and the pinch wheel 52 and the gripping action against the film 26 may best be understood by reference to Figure 14 which is a cross-sectional view through the axis XIV—XIV, Figure 5, with parts in elevation. As will be apparent from this view, a tire 52*a* of rubber or other resilient gripping material surrounds the pinch wheel 52. This tire rides against the film 26 to press it into the groove 50*a* provided in the surface of the capstan 50.

One of the features of the present invention resides in the positive constant speed drive of the film 26 produced by the capstan 50 and the pinch wheel 52*a*. The film 26 is of Celluloid or similar material and has relatively poor frictional engagement with the capstan 50 which is best made of metal to achieve a true circular cross-section. However, as indicated in Figure 14, the pinch wheel 52 has a tire 52*a* which is of rubber or the like and which has a good coefficient of friction with both the film 26 and the capstan 50. At the region 52*b*, Figure 14, the tire 52*a* engages the capstan 50 and thus transmits torque from the capstan 50 to the pinch wheel 52. The film 26 is accelerated or decelerated in accord with this torque by the frictional contact between tire 52*a* and film 26 in the region 52*d*. Thus, even if the direct frictional contact between film 26 and capstan 50 is relatively ineffective, the supplementary frictional contact from capstan 50 to tire 52*a* and from tire 52*a* to the film 26 serves to maintain the movements of film 26 in accord with the movements of the capstan 50.

Winding rotations of the reel 34 and rotations of the wheel 42 cause the medium 26 to travel upwardly from pinch wheel 52 as indicated by the arrow 46, Figure 1. This motion is of somewhat intermittent character by reason of the successive engagements of the spokes or projections 42*a* of the wheel 42 with the indexing openings 30 of the film 26. The resultant intermittent force applied to capstan 50 by this intermittent pull does not, however, result in variations of the linear velocity of the medium 26 over the head assembly 62 because the flywheel assembly 134 opposes any force tending to accelerate or decelerate capstan 50. Thus the tendency of the projector P to impart cyclical frequency variations or "wow" to the reproduced intelligence from the head assembly 62 is overcome.

The upward pull of driving wheel 42 and reel 34 on the film 26 supplements the biasing force of the spring 130 to swing the arm 118 in direction to cause the pinch wheel 52 to engage capstan 50 and force the film 26 against the surface thereof with increased force. This results from the fact that medium 26 is tensioned as pinch wheel 52 is swung to a disengaged position relative to capstan 50. Thus, pull on the film 26 which would otherwise tend to make the film slip relative to the capstan 50 causes the medium to be held thereagainst with increased force and hence decreases the tendency of film 26 to slip relative thereto. Consequently, the mechanism automatically adjusts itself to variations in the pull on the film 26 associated with the operation of the wheel 42.

Figure 15 is an enlarged fragmentary view of the construction of the upwardly extending shoe portion of the arm 111*b*. The shoe 111*b* has a plurality of openings facing medium 26 and which receive the plungers 200. These openings are spaced longitudinally of the medium 26 and ride against the magnetizable track 64, Figure 8, of the medium 26 in the regions on and adjacent to the air gap 110*b* of head 110. Each plunger is biased upwardly against the medium 26 by an individual spring 202 which serves to bias the portion of the medium 26 upon which that plunger rests against the head 110 with a pre-selected force independent of the force exerted by the other plungers.

The plungers 200 urge medium 26 against the head 110 with a uniform force over a space considerably longer than the air gap 110*b*. Consequently, if the arm 111 becomes slightly misaligned relative to the air gap 110*b*, there is no tendency for a part of medium 26 to ride free of the forces exerted by the shoe 111*b*, and medium 26 rides against the core 110*a* in the region of air gap 110*b* at all times.

If desired, the film 26 may have two magnetizable sound channels on the opposite faces thereof, one channel being on one face along the edge of the indexing openings 30, as shown in Figure 8, and the other being along the opposite edge and on the other face. A modified film of this type is shown in Figure 16, the track 64*a* being along the opposite edge of the face opposite to that bearing track 64. By making half twists in the film 26 between the gate mechanism 44 and the head mechanism 62 and between the pinch wheel 52 and the wheel 42, the latter channel may be used. It is therefore possible to have two separate and independent audible program accompaniments to the same visual program, either of which may be reproduced as desired.

The head assembly 62 is spaced from the gate mechanism 44 a sufficient distance to accommodate a film twist without unduly flexing the film, thereby avoiding undue wear on the film when the channel or track 64*a* is being used. In the case of 8 mm. film, for example, I have found that a spacing of 3 inches between gate mechanism 44 and head assembly 62 may be used although approximately 6 inches is preferable. Proportionately greater distances are required for wider films.

It will be apparent to those skilled in the art that in accordance with the present invention I have provided an improved magnetic recording and reproducing mechanism for use in conjunction with a motion picture projector, and which may be made and sold as a separate unit applicable to many kinds of motion picture projectors. Moreover, the mechanism of the present invention acts as a support for the motion picture projector and sustains the projector in a position to display the visual program. In addition, the elements engaged by the film are all located on the same side of the structure as is the gate mechanism, reels, and drive wheels of the projector, and these elements are arranged so that the film may be threaded therethrough in a manner similar to that of the projector itself, thereby providing a maximum degree of convenience. Further, it will be apparent to those skilled in the art that by providing a mechanical filter and capstan arrangement in conjunction with my improved mechanism, I utilize the mechanical drive of the motion picture projector and thereby not only eliminate the need for a mechanical drive system in the magnetic recording and reproducing portion of the mechanism but further avoid all problems incident to synchronizing the movements of the magnetic recording and reproducing mechanism with those of the projector.

It will be apparent that member 96 may define a track by means of a groove, such as groove 98, upstanding posts, rails, or other suitable means.

In the appended claims I use the term take-up device to designate a device, such as sprocket 42 or take-up reel 34, which winds up the medium after traversing gate mechanism 44.

While I have shown a particular embodiment of my invention, it will, of course, be understood that I do not wish to be limited thereto since many modifications, both in the elements employed and their cooperative structure may be made without departing from the spirit and scope of my invention. I, of course, contemplate by the appended claims to cover any such modifications as fall within the true spirit and scope of my invention.

An invention having features in common with the present invention is described and claimed in my copending application entitled "Magnetic Recorder Drive Mechanism," Serial No. 124, filed concurrently with this application.

I claim as my invention:

1. In a magnetic recording and reproducing device in which a lengthy magnetizable medium is drawn between a supply reel and a take-up reel with intermittent motion, means for stabilizing the motion of said medium and for recording and reproducing intelligence on said medium comprising an idler roller for receiving said medium about a portion of its periphery, said roller having a peripheral groove of less depth than the thickness of said medium, a pinch wheel pivotally mounted in proximity to said roll in the path of movement of said medium whereby said medium when trained about a portion of the periphery of said pinch wheel urges said pinch wheel into engagement with the periphery of said idler roller, said pinch wheel having a resilient tire with a high co-efficient of friction with said medium and said idler roller.

2. In a magnetic recording and reproducing device in which a lengthy magnetizable medium is drawn between a supply reel and a take-up reel with intermittent motion, means for stabilizing the motion of said medium and for recording and reproducing intelligence on said medium comprising an idler roller for receiving said medium about a portion of its periphery, said roller having a peripheral groove of less depth than the thickness of said medium, a flywheel of substantial mass mounted for rotation with said idler roller, a pinch wheel pivotally mounted in proximity to said roller in the path of movement of said medium whereby said medium when trained about a portion of the periphery of said pinch wheel urges said pinch wheel into engagement with the periphery of said idler roller, said pinch wheel having a resilient tire thereon with a high co-efficient of friction with said medium and said idler roller.

References Cited in the file of this patent

UNITED STATES PATENTS

| Number | Name | Date |
|---|---|---|
| 1,442,682 | De Forest | Jan. 16, 1923 |
| 1,466,750 | Peterson | Sept. 4, 1923 |
| 1,612,359 | Chipman | Dec. 28, 1926 |
| 1,653,467 | O'Neill | Dec. 20, 1927 |
| 1,781,945 | Case | Nov. 18, 1930 |
| 1,808,551 | Heisler | June 2, 1931 |
| 1,847,860 | Best | Mar. 1, 1932 |
| 1,865,055 | Case | June 28, 1932 |
| 1,877,731 | Kuckenmeister | Sept. 13, 1932 |
| 1,883,559 | Chipman | Oct. 18, 1932 |
| 1,883,562 | Chipman et al. | Oct. 18, 1932 |
| 1,949,409 | Cohen | Mar. 6, 1934 |
| 1,971,454 | Loomis | Aug. 28, 1934 |
| 1,997,088 | Stewart | Apr. 9, 1935 |
| 2,042,027 | Simons | May 26, 1936 |
| 2,058,193 | Victor | Oct. 20, 1936 |
| 2,092,185 | Ross | Sept. 7, 1937 |
| 2,095,848 | Wittel | Oct. 12, 1937 |
| 2,493,056 | Bartelson | Jan. 3, 1950 |
| 2,499,699 | Tinkham | Mar. 7, 1950 |
| 2,532,761 | Blasio | Dec. 5, 1950 |
| 2,558,432 | Haloski | June 26, 1951 |

FOREIGN PATENTS

| Number | Country | Date |
|---|---|---|
| 69,273 | Norway | May 28, 1945 |
| 172,296 | Great Britain | Feb. 26, 1923 |
| 197,630 | Switzerland | Aug. 1, 1938 |
| 347,950 | Great Britain | May 7, 1931 |
| 751,819 | France | June 26, 1933 |

OTHER REFERENCES

"Journal of the Society of Motion Picture Engineers," vol. 51, November 1948, page 469.